(12) United States Patent
Exton et al.

(10) Patent No.: US 6,910,041 B2
(45) Date of Patent: Jun. 21, 2005

(54) AUTHORIZATION MODEL FOR ADMINISTRATION

(75) Inventors: Scott Anthony Exton, Brisbane (AU); Michael Powell, Carrara (AU); Brian James Turner, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 09/935,394

(22) Filed: Aug. 23, 2001

(65) Prior Publication Data

US 2003/0041198 A1 Feb. 27, 2003

(51) Int. Cl.⁷ .............................. G06F 7/00; G06F 17/30
(52) U.S. Cl. ..................... 707/9; 707/103 R; 709/200; 709/205
(58) Field of Search ........................ 707/9, 103 R; 709/200, 225, 229

(56) References Cited

U.S. PATENT DOCUMENTS

| | | | |
|---|---|---|---|
| 5,173,939 A | | 12/1992 | Abadi et al. ............... 380/25 |
| 5,283,830 A | | 2/1994 | Hinsley et al. ............ 380/25 |
| 5,315,657 A | * | 5/1994 | Abadi et al. ............. 713/201 |
| 5,335,346 A | * | 8/1994 | Fabbio ..................... 711/163 |
| 5,649,099 A | | 7/1997 | Theimer et al. ....... 395/187.01 |
| 5,778,222 A | * | 7/1998 | Herrick et al. .............. 707/9 |
| 5,956,715 A | * | 9/1999 | Glasser et al. ............... 707/9 |
| 6,061,684 A | | 5/2000 | Glasser et al. ............... 707/9 |
| 6,105,063 A | | 8/2000 | Hayes, Jr. ................ 709/223 |
| 6,154,741 A | | 11/2000 | Feldman ..................... 707/9 |
| 6,189,036 B1 | | 2/2001 | Kao ........................ 709/229 |
| 6,192,405 B1 | | 2/2001 | Bunnell .................... 709/225 |
| 6,233,576 B1 | * | 5/2001 | Lewis ......................... 707/9 |
| 6,453,353 B1 | * | 9/2002 | Win et al. ................ 709/229 |

OTHER PUBLICATIONS

Che–Fn Yu (1989), "Access control and authorization plan for customer control of network services", pp. 0862–0869.*
Steven J. Greenwald (1996), "A new security policy for distributed resource management and access control", pp. 74–86.*

* cited by examiner

Primary Examiner—Frantz Coby
Assistant Examiner—Merilyn Nguyen
(74) Attorney, Agent, or Firm—Duke W. Yee; Jeffrey S. LaBaw; Stephen J. Walder, Jr.

(57) ABSTRACT

An administration model is provided that uses access control lists to define permissions for users and groups of users. The model identifies a number of objects to be administered. Associated with each of these objects is a set of administrative operations that can be performed on the object. For each of these operations a permission in an access control list entry is defined. The protected resources are arranged in a hierarchical fashion and an access control list can be associated with any point in the hierarchy. The access control list provides fine-grained control over the protected resources. At the time an administrator requests to perform an operation, the administrator's identification is used to look up the prevailing access control list to determine whether the operation is permitted.

33 Claims, 4 Drawing Sheets

AUTHORIZATION MODEL FOR ADMINISTRATION

BACKGROUND OF THE INVENTION

1. Technical Field

The present invention relates to data processing and, in particular, to administration in a computer network. Still more particularly, the present invention provides a method, apparatus, and program for administration of managed resources using access control lists.

2. Description of Related Art

A resource manager software manages resources in a network. Many operating systems provide resource management for very low level resources, such as files and folders. These resources may be managed using access control lists that define users and groups of users and the operations that are permitted for those users and groups of users. However, these permissions are hard coded into the operating system and are limited to permissions associated with files and folders, such as read, write, create, and delete. In order to provide resource management on a higher level, management server software is typically developed to enforce administration models.

Most administration models today revolve around defining a role for a particular administrator and then associating a number of tasks that a person with that role is permitted to perform. This is limiting in that only a limited number of roles can be defined. All administrators must be pigeon holed into one role or another. Furthermore, the task list is static and hard coded into the management server software. It also has a security exposure, because once an administrator is logged in with a specific group privilege, revoking the privilege is not possible until the login is terminated.

Therefore, it would be advantageous to provide an improved administration model in which the permission sets are not predefined and can be customized based on the resource being administered.

SUMMARY OF THE INVENTION

The present invention provides an administration model using access control lists. The model identifies a number of resource types to be administered, e.g. Groups of users. Associated with each of these resource types is a set of administrative operations that can be performed on the resource. For each of these operations a permission in an access control list entry is defined. The actual resources (of a defined resource type) protected by the model are arranged in a hierarchical fashion, much like files and directories within a directory structure. To control authorization on a resource an access control list is attached to some point in the object space. When an operation is requested on a resource an authorization decision is made based on the access control list which is attached to the resource, or the closest access control list attached above the resource in the object space. At the time an administrator requests to perform an operation, the administrator's identification is used to look up the prevailing access control list to determine whether the operation is permitted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
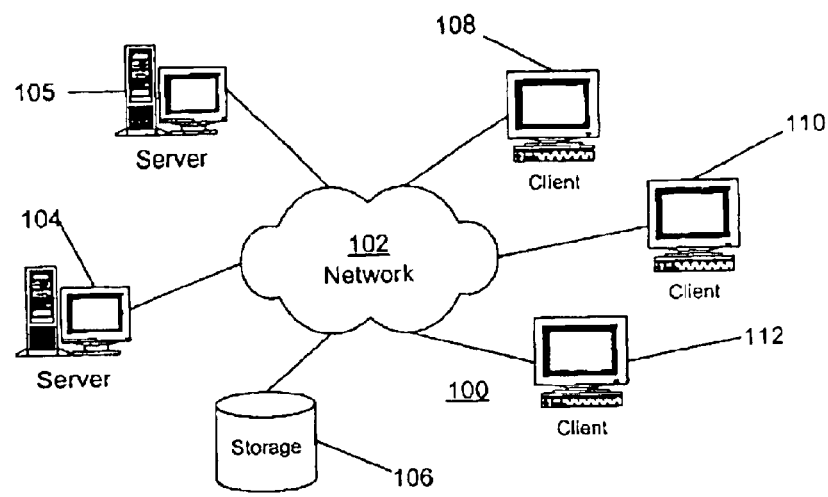
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 105 are connected to network 102 along with storage unit 106. In addition, clients 108, 110, and 112 are connected to network 102. These clients 108, 110, and 112 may be, for example, personal computers or network computers. In the depicted example, servers 104, 105 provide data, such as boot files, operating system images, and applications to clients 108–112. Clients 108, 110, and 112 are clients to servers 104, 105. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
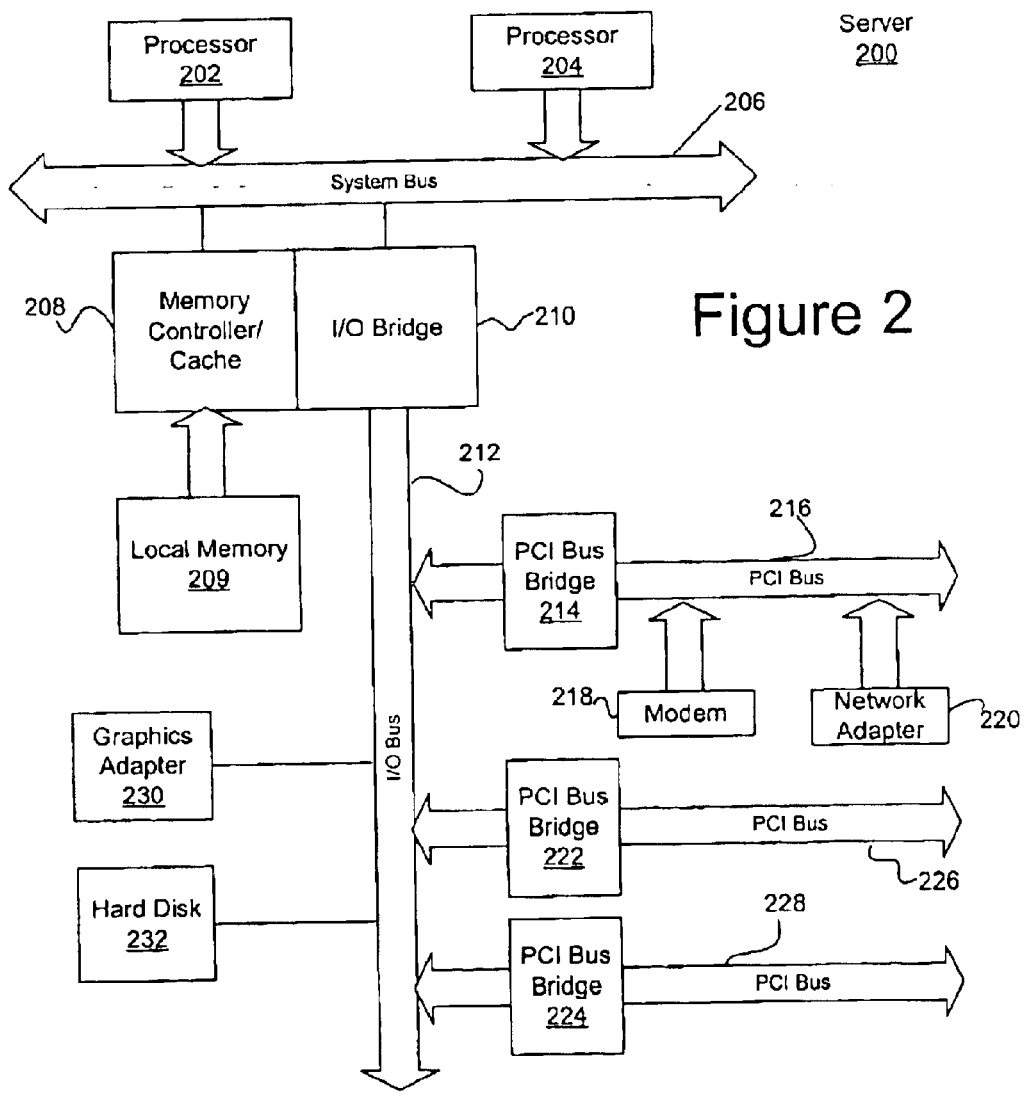
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
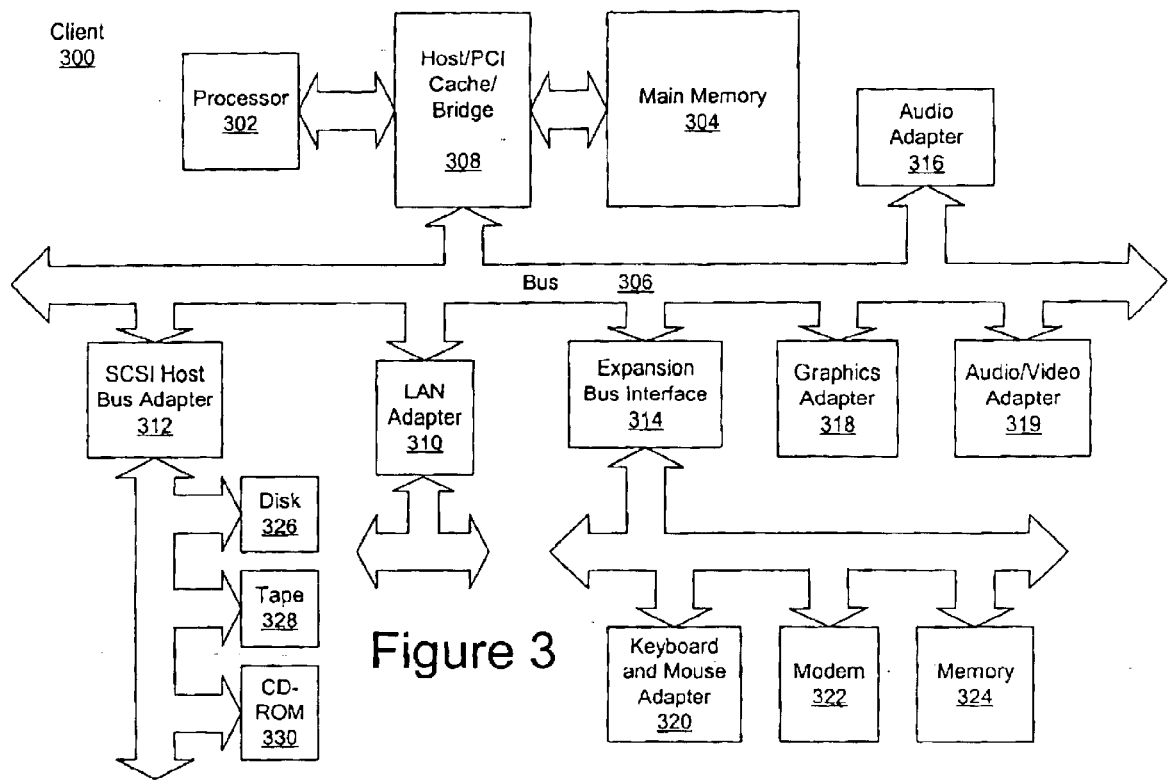
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
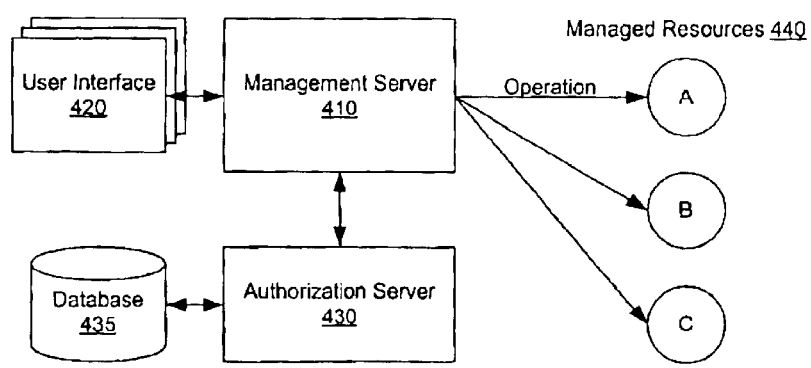
FIG. 4 is a block diagram of an authorization model in accordance with a preferred embodiment of the present invention.

With reference to FIG. 4, a block diagram of an authorization model is shown in accordance with a preferred embodiment of the present invention. Management server 410 may receive requests to perform operations on managed resources 440 from user interfaces 420. Management server 410 may be one of the servers shown in FIG. 1, such as server 104. User interfaces 420 may reside on clients, such as clients 108, 110, 112 in FIG. 1. A request includes a user identification, an operation to be performed, and an identification of the resource. Managed resources 440 may be any resources in the network, such as groups of users, a host computer, or a database.

The management server provides the user, operation, and resource information to authorization server 430. Authorization server 430 may be one of the servers shown in FIG. 1, such as server 105. Alternatively, the authorization server may reside on the same physical server as the management server. A resource may be an object to be administered. Associated with each of these objects is a set of administrative operations that can be performed on the object. For each of these operations a permission in an access control list (ACL) entry is defined. The resources within the system are arranged in a hierarchical fashion and an ACL entry can be associated with any point within the hierarchy. The authorization server determines which ACL to use when making authorization decisions by searching the hierarchy for the ACL which is attached closest to the resource, but not below or in a separate branch of the hierarchy. Authorization server 430 permits or denies requests based on information in the ACL for the resource.

Figure 5A:
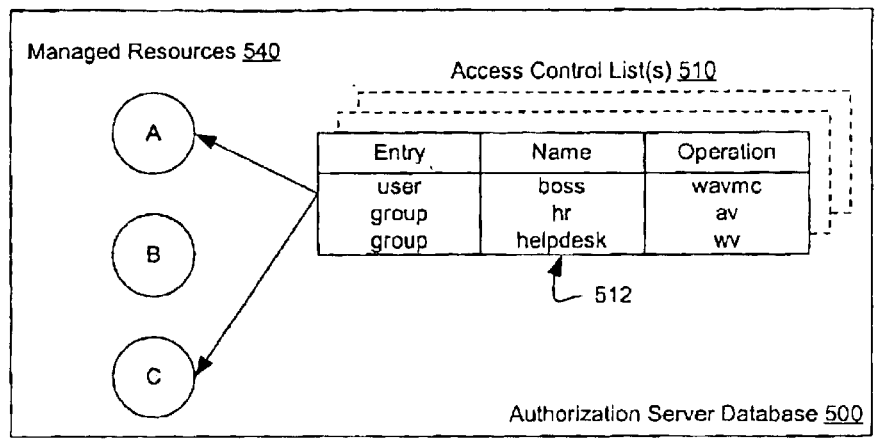
FIG. 5A is a diagram illustrating an authorization server database in accordance with a preferred embodiment of the present invention.

With reference now to FIG. 5A, a diagram illustrating an authorization server database is shown in accordance with a preferred embodiment of the present invention. Authorization server database 500 includes a plurality of access control lists 510 associated with a plurality of managed resources 540. Objects representing the resources may also be stored in the authorization server database, particularly when the resource is something more abstract, such as a supplier, rather than something that is typically stored in a database, such as a file. In particular, ACL 512 is associated with resources A and C. ACL 512 includes an entry, name, and operation field for each ACL entry. For example, the first entry has an entry of "user" to indicate that the entry is for an individual user, rather than a group of users. The name of the user is "boss" and the operations permitted for "boss" are "wavmc". In this example, the resources are groups of users and the permissions are "w" for change password, "a" for add user, "v" for view list of users in the group, "m" for modify, and "c" for create new group. Thus, in the example shown in FIG. 5A, the user "boss" is permitted to perform all operations on groups A and C.

The second entry in ACL 512 has an entry of "group" to indicate that the entry is for a group of users. The name of the group is "hr" for human resources. The operations permitted for the group "hr" are "av". In other words, users in the human resources group are allowed to add users to groups A & C and view lists of users in these groups. The third entry in ACL 512 has an entry of "group" and a name of "helpdesk". The operations permitted for users in the "helpdesk" group are "wv", indicating that those users are permitted to change a password and view a list of users in the A & C groups. Thus, if a user in the group calls the helpdesk, a helpdesk user may view the users in the group to supply help and, perhaps, change the password if a user in the group has forgotten his or her password.

When the authorization server searches the ACL, the authorization server may stop search in the ACL with the most specific match. For example, if the user "boss" is also a member of the group "hr", the authorization server may stop at the more specific "user" entry, rather than looking for a "group" entry that matches. Therefore, a user may be given more or fewer permissions than the group to which he or she belongs. Alternatively, the authorization server may stop the search at the least specific match, depending on the administration policy. For example, the user "boss" may be limited to helpdesk permissions when "boss" is logged in as a member of the "helpdesk" group.

For same level matches, such as when a user belongs to more than one group, the authorization server may perform an "OR" operation on the permissions. For example, a user may be logged in as a member of "hr" and "helpdesk". The authorization server may then "OR" the permissions to arrive at "wav" or change password, add user, and view list of users in the group. Other techniques may also be used to resolve multiple matches at the same level.

Figure 5B:
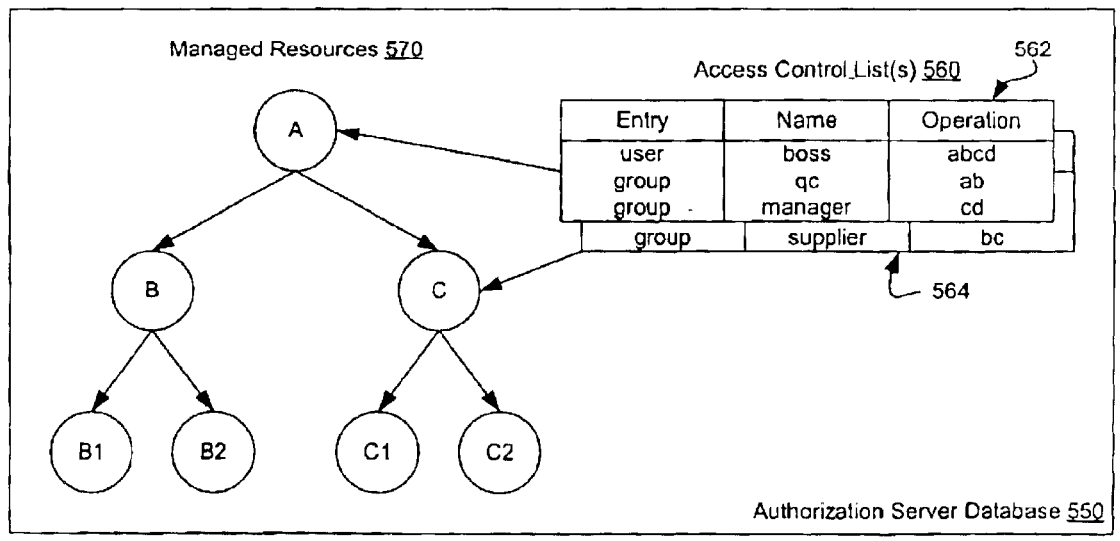
FIG. 5B is a diagram illustrating an authorization server database for a group of resources arranged in a hierarchical fashion in accordance with a preferred embodiment of the present invention.

Turning now to FIG. 5B, a diagram illustrating an authorization server database for a group of resources arranged in a hierarchical fashion is shown in accordance with a preferred embodiment of the present invention. Authorization server database 550 includes a plurality of access control lists 560 associated with a plurality of managed resources 570. The groups within this model are arranged in a hierarchical fashion, and access control lists may be attached to any point in the hierarchy. By way of example, a manufacturer (A) has various suppliers (B and C) and each of the suppliers has numerous groups.

The manufacturer may delegate administration privileges for a supplier's groups to the supplier itself. ACL 562 may be created and attached to resource A. This ACL would control the management of groups B1, B2, C1, and C2. ACL 564 could then be created giving administration privileges to someone in resource C and attached at that point in the object hierarchy. This ACL would then control the management of groups C1 and C2. Thus multiple groups may be managed by a single access control list, removing the need to manually associate access control lists with every group in the system.

Figures 6A, 6B:
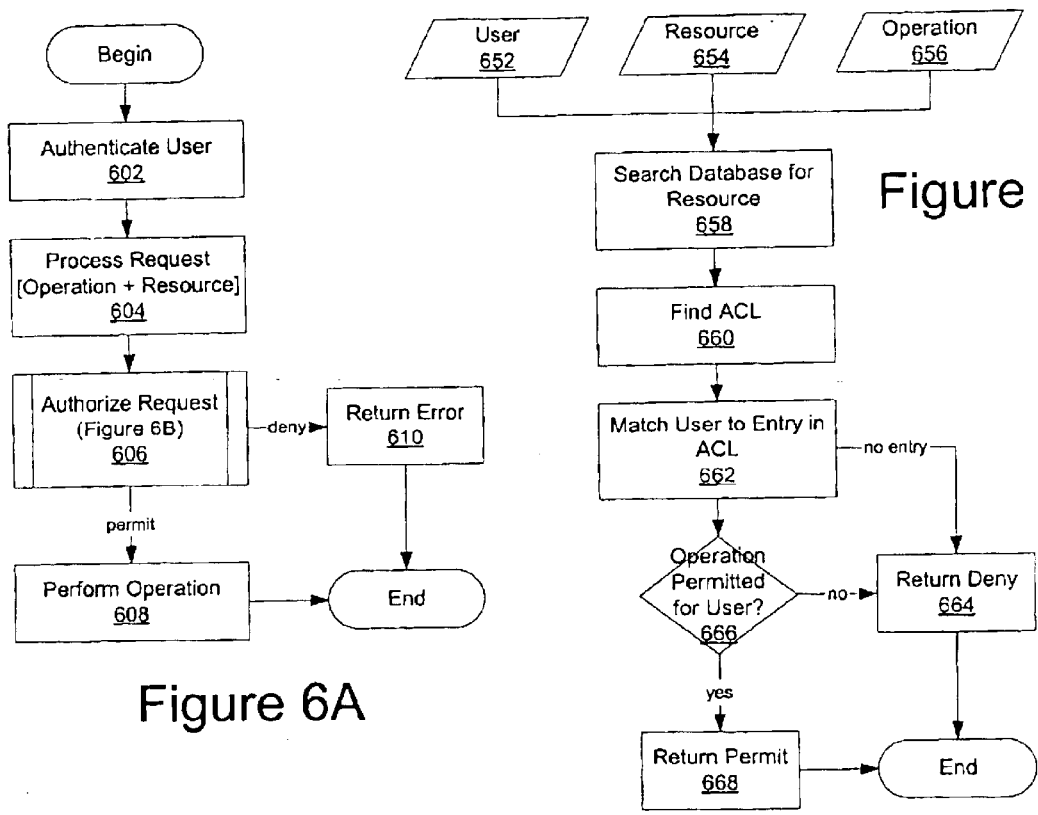
FIGS. 6A and 6B are flowcharts illustrating decision logic for the management server and the authorization server in accordance with a preferred embodiment of the present invention.

With reference to FIGS. 6A and 6B, flowcharts are shown illustrating decision logic for the management server and the authorization server in accordance with a preferred embodiment of the present invention. Particularly, with respect to FIG. 6A, decision logic is shown for a management server processing an operation request from a user. The process begins and authenticates a user (step 602). The process then receives and processes a request including an operation and a resource (step 604). Next, the process authorizes the request (step 606) based on results from the authorization server. The detailed operation of the authorization server is discussed below with reference to FIG. 6B. If the authorization server permits the operation, the process performs the operation (step 608) and ends. If the authorization server denies the operation, the process returns an error (step 610) and ends.

Turning now to FIG. 6B, decision logic is shown for an authorization server processing an operation request. The process begins by receiving a user (652), a resource (654), and an operation to be performed (656). Next, the process searches the database for the resource (step 658) and finds the access control list (step 660). Thereafter, the process matches the user to an entry in the access control list (step 662). If no entry is found for the user, the process returns "deny" to the management server (step 664) and ends.

If an entry is found, a determination is made as to whether the operation is permitted for the user (step 666). If the operation is not permitted, the process proceeds to step 664 to return "deny" to the management server and ends. If the operation is permitted in step 666, the process returns "permit" to the management server (step 668) and ends.

Thus, the present invention solves the disadvantages of the prior art by providing an administration model using access control lists. The model identifies a number of objects to be administered. Associated with each of these objects is a set of administrative operations that can be performed on the object. For each of these operations a permission in an access control list entry is defined. The protected resources are arranged in a hierarchical fashion and an access control list may be associated with any point in the hierarchy. The access control list provides fine-grained control over the protected resources. At the time an administrator requests to perform an operation, the administrator's identification is used to look up the prevailing access control list to determine whether the operation is permitted.

This administration model allows different administrators to be given different permission sets by virtue of having entries in an access control list identified by user identification. The permission sets are not predefined based on a role and can be customized based on the object being administered. The enforcement is done at the time the operation is requested and, hence, privileges can be instantaneously revoked. Furthermore, an entity, such as a mid tier server, may impersonate another identity for the duration of an administration operation. This facilitates implementation of simple management services where the end user may not be directly authenticated to the management server, but the management server has some sort of trust relationship with the end user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for administering managed resources, comprising:
    defining a set of privileges for a first managed resource, wherein the first managed resource is one of a plurality of managed resources arranged in a hierarchy;
    attaching an access control list to an object that represents the first managed resource, wherein the access control list assigns at least one privilege from the set of privileges to an entity; and
    wherein the access control list controls access to the first managed resource and at least one second managed resource of the plurality of managed resources at a level below the first managed resource in the hierarchy, without directly associating a copy of the access control list with the at least one second managed resource.

2. The method of claim 1, wherein the entity is an individual user.

3. The method of claim 1, wherein the entity is a group of users.

4. The method of claim 1, wherein the set of privileges comprises a set of operations that may be performed for the managed resource and at least one second managed resource of the plurality of managed resources at the level below the first managed resource in the hierarchy.

5. A computer implemented method for administering a plurality of managed resources including at least one first level resource and at least one second level resource, wherein each of the at least one second level resource is a subresource of a first level resource, comprising:
    defining a first set of permissions for the at least one first level resource; and
    attaching a first access control list to a first object that represents a first managed resource;
    wherein the first managed resource is a first level resource and the first access control list controls access, by a first entity, to the first managed resource and the at least one second level resource based on the first set of permissions, and wherein the first access control list controls access to the first managed resource and the at least one second level resource, without directly associating a copy of the first access control list with the at least one second level resource.

6. The method of claim 5, wherein the first entity is an individual user.

7. The method of claim 5, wherein the first entity is a group of users.

8. The method of claim 5, wherein the first set of permissions comprises a set of operations that may be performed for the at least one first level resource.

9. The method of claim 5, further comprising:
    defining a second set of permissions for a second managed resource; and
    attaching a second access control list to a second object that represents the second managed resource,
    wherein the second access control list controls access to the second managed resource and at least one subresource of the second managed resource based on the second set of permissions, and wherein the second access control list controls access to the second managed resource and the at least one subresource without directly associating a copy of the second access control list with the at least one subresource.

10. A computer implemented method for administering managed resources, comprising:
    receiving a request from a user to perform an operation on a first managed resource, wherein the first managed resource is one of a plurality of managed resources arranged in a hierarchy;
    finding an access control list corresponding to the first managed resource; and
    determining whether the operation is permitted for the user based on the access control list, wherein the access control list includes a set of permissions for performing a set of operations on the first managed resource and at least one second managed resource of the plurality of managed resources at a level above the first managed resource in the hierarchy, and
    wherein the access control list is not directly associated with the first managed resource.

11. The method of claim 10, wherein the step of finding an access control list comprises searching the hierarchy for an access control list which is attached closest to the first managed resource.

12. The method of claim 10, wherein the step of finding an access control list comprises finding a first access control list that assigns a first permission from the set of permissions for the user and a second access control list that assigns a second permission from the set of permissions for the user.

13. The method of claim 12, wherein the step of determining whether the operation is permitted for the user comprises selecting the access control list, from the first access control list and the second access control list, with a permission that least specifically matches the user.

14. The method of claim 2, wherein the first permission identifies a first set of operations from the set of operations permitted for the user and the second permission identifies a second set of operations from the set of operations permitted for the user, and
    wherein the step of determining whether the operation is permitted for the user comprises performing an OR operation on the first set of operations and the second set of operations.

15. The method of claim 10, wherein the method is performed by an authorization server.

16. A computer apparatus for administering managed resources, comprising:
    definition means for defining a set of privileges for a first managed resource, wherein the first managed resource is one of a plurality of managed resources arranged in a hierarchy;
    attachment means for attaching an access control list to an object that represents the first managed resource, wherein the access control list assigns at least one privilege from the set of privileges to an entity; and
    controlling means for controlling access to the first managed resource and at least one second managed resource of the plurality of managed resources at a level below the first managed resource in the hierarchy based on the access control list, without directly associating a copy of the access control list with the at least one second managed resource.

17. The apparatus of claim 16, wherein the entity is an individual user.

18. The apparatus of claim 16, wherein the entity is a group of users.

19. The apparatus of claim 16, wherein the set of privileges comprises a set of operations that may be performed for the first managed resource and at one least one second managed resource of the plurality of managed resources at the level below the first managed resource in the hierarchy.

20. A computer apparatus for administering a plurality of managed resources including at least one first level resource and at least one second level resource, wherein each of the at least one second level resource is a subresource of a first level resource, comprising:
    definition means for defining a first set of permissions for the at least one first level resource; and
    attachment means for attaching a first access control list to a first object that represents a first managed resource;
    wherein the first managed resource is a first level resources and the first access control list controls access, by a first entity, to the first managed resource and the at least one second level resource based on the first set of permissions, and wherein the first access control list controls access to the first managed resource and the at least one second level resource without directly associating a copy of the first access control list with the at least one second level resource.

21. The apparatus of claim 20, wherein the first entity is an individual user.

22. The apparatus of claim 20, wherein the first entity is a group of users.

23. The apparatus of claim 20, wherein the first set of permissions comprises a set of operations that may be performed for the at least one first level resource.

24. The apparatus of claim 20, further comprising:
    means for defining a second set of permissions for a second managed resource; and
    means for attaching a second access control list to a second object that represents the second managed resource, where the second access control list controls access to the second managed resource and at least one subresource of the second managed resource based on the second set of permissions, and wherein the second access control list controls access to the second managed resource and the at least one subresource without directly associating a copy of the second access control list with the at least one subresource.

25. A computer apparatus for administering managed resources, comprising:
    receipt means for receiving a request from a user to perform an operation on a first managed resource, wherein the first managed resource is one of a plurality of managed resources arranged in a hierarchy;
    search means for finding an access control list corresponding to the first managed resource; and
    determination means for determining whether the operation is permitted for the user based on the access control list, wherein the access control list includes a set of permissions for performing a set of operations on the first managed resource and at least one second managed resource in the plurality of managed resources at a level above the first managed resource in the hierarchy, and wherein the access control list is not directly associated with the first managed resource.

26. The apparatus of claim 25, wherein wherein the search means comprises means for searching the hierarchy for an access control list which is attached closest to the first managed resource.

27. The apparatus of claim 25, wherein the search means comprises means for finding a first access control list that assigns a first permission from the set of permissions for the user and a second access control list that assigns a second permission from the set of permissions for the user.

28. The apparatus of claim 27, wherein the determination means comprises means for selecting the access control list, from the first access control list and the second access control list, with a permission that least specifically matches the user.

29. The apparatus of claim 27, wherein the first permission identifies a first set of operations from the set of operations permitted for the user and the second permission identifies a second set of operations from the set of operations permitted for the user, and
    wherein the determination means comprises means for performing an OR operation on the first set of operations and the second set of operations.

30. The apparatus of claim 27, wherein the apparatus comprises an authorization server.

31. A computer program product, in a computer readable medium, for administering managed resources, comprising:
    instructions for defining a set of privileges for the at least a first managed resource, wherein the first managed resource is one of a plurality of managed resources arranged in a hierarchy;
    instructions for attaching an access control list to an object that represents the first managed resource, wherein the access control list assigns at least one privilege from the set of privileges to an entity; and
    instructions for controlling access to the first managed resource and at least one second managed resource of the plurality of managed resources at a level below the first managed resource in the hierarchy based on the access control list, without directly associating a copy of the access control list with the at least one second managed resource.

32. A computer program product, in a computer readable medium, for administering a plurality of managed resources including at least one first level resource and at least one second level resource, wherein each of the at least one second level resource is a subresource of a first level resource, comprising:
    instructions for defining a first set of permissions for the at least one first level resource;

instructions for attaching a first access control list to a first object that represents a first managed resource, wherein the first managed resource is a first level resource and the first access control list controls access to the first managed resource and at least one second level resource based on the first set of permissions, and wherein the first access control list controls access to the first managed resource and the at least one second level resource without directly associating a copy of the first access control list with the at least one second level resource.

33. A computer program product, in a computer readable medium, for administering managed resources, comprising:

instructions for receiving a request from a user to perform an operation on a first managed resource, wherein the first managed resource is one of a plurality of managed resources arranged in a hierarchy;

instructions for finding an access control list corresponding to the first managed resource; and instructions for determining whether the operation is permitted for the user based on the access control list, wherein the access control list includes a set of permissions for performing a set of operations on the first managed resource and at least one second managed resource in the plurality of managed resources at a level above the first managed resource in the hierarchy, and wherein the access control list is not directly associated with the first managed resource.

* * * * *

UNITED STATES PATENT AND TRADEMARK OFFICE
CERTIFICATE OF CORRECTION

| | | |
|---|---|---|
| PATENT NO. | : 6,910,041 B2 | Page 1 of 1 |
| APPLICATION NO. | : 09/935394 | |
| DATED | : June 21, 2005 | |
| INVENTOR(S) | : Exton et al. | |

It is certified that error appears in the above-identified patent and that said Letters Patent is hereby corrected as shown below:

Col. 8, line 58: after "claim" delete "2" and insert --12--.

Signed and Sealed this

Twenty-second Day of August, 2006

JON W. DUDAS
*Director of the United States Patent and Trademark Office*